United States Patent
Hagiwara et al.

(10) Patent No.: US 6,642,444 B2
(45) Date of Patent: Nov. 4, 2003

(54) APPARATUS FOR PLAYING MUSIC WITH ENHANCED PART PERFORMANCE AND COMPUTER PROGRAM THEREFOR

(75) Inventors: Hideki Hagiwara, Hamamatsu (JP); Masaaki Okabayashi, Hamakita (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 10/120,998

(22) Filed: Apr. 11, 2002

(65) Prior Publication Data

US 2002/0148345 A1 Oct. 17, 2002

(30) Foreign Application Priority Data

Apr. 12, 2001 (JP) .......................... 2001-113573

(51) Int. Cl.[7] .............. G04B 13/00; G10H 7/00
(52) U.S. Cl. ................ 84/609; 84/610; 84/626; 84/634; 84/649; 84/662
(58) Field of Search ............. 84/609–614, 626–638, 84/649–652, 662–669

(56) References Cited

U.S. PATENT DOCUMENTS 5,107,745 A * 4/1992 Utsumi ................. 84/612
5,117,728 A * 6/1992 Shibukawa et al. ........... 84/633
5,432,293 A * 7/1995 Nonaka et al. ........... 84/633 X
5,900,565 A * 5/1999 Matsuda ................. 84/609

* cited by examiner

Primary Examiner—Marlon T. Fletcher
(74) Attorney, Agent, or Firm—Rossi & Associates

(57) ABSTRACT

Plural part playback channels each play back music performance signals of respectively assigned performance parts selectively in an enhanced mode or in an unenhanced mode. When an enhanced mode is designated for a particular channel 2 (at time A), the channel 2 plays back the music performance signals in a prominent manner and channels 1, 3–6 plays back in a suppressed manner. The tone volume of the channels 1, 3–6 in the suppressed manner is set by manipulating the contrast dial CD. Where the enhanced mode is set for plural channels 2 and 6 (between time C and time D), manipulation of an enhanced mode clear switch SC (at time D) causes cancellation of the prominent manner of playback at the channels 2 and 6 as well as the suppressed manner of playback at the channels 1, 3–5.

16 Claims, 11 Drawing Sheets

Hardware Configration of Playback System (Digital Mixer)

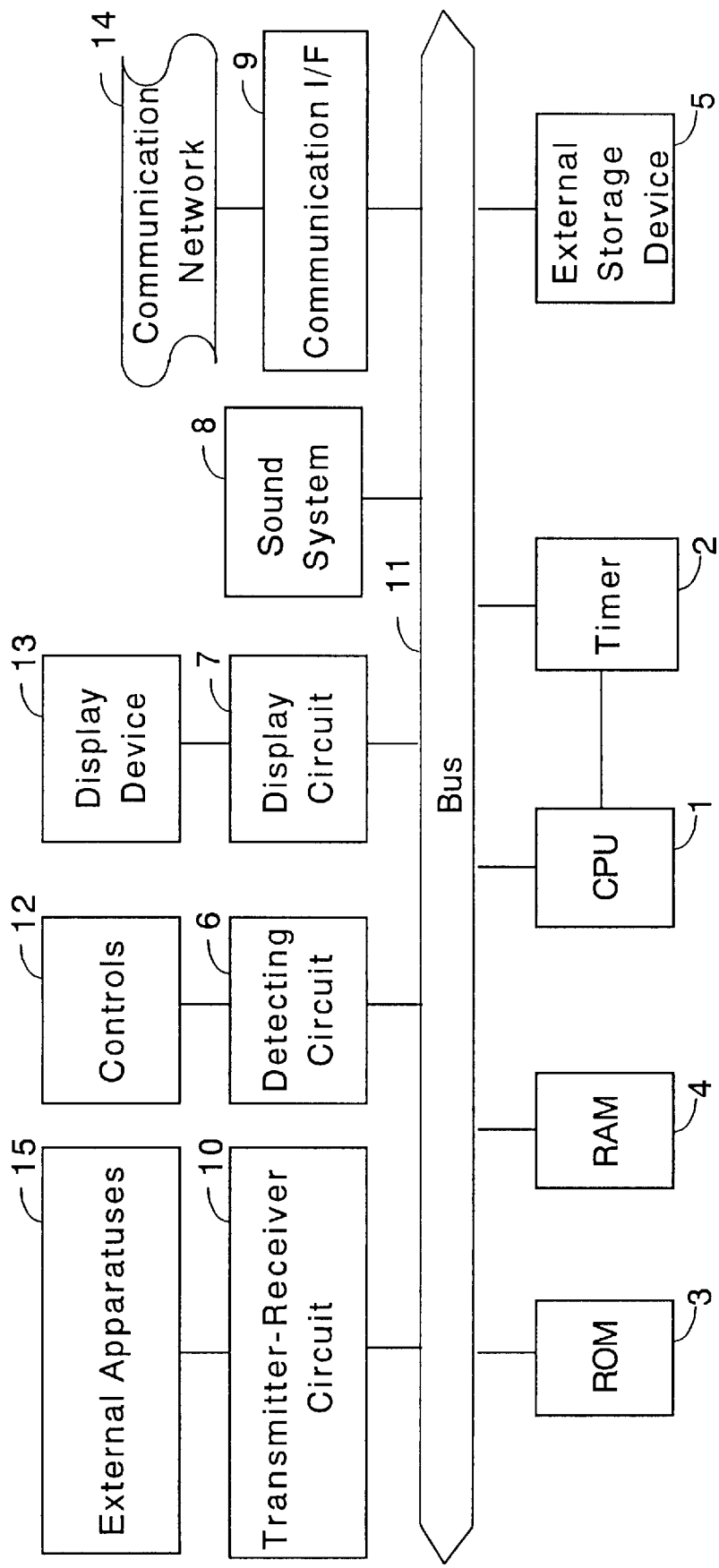
Fig. 1 Hardware Configration of Playback System (Digital Mixer)

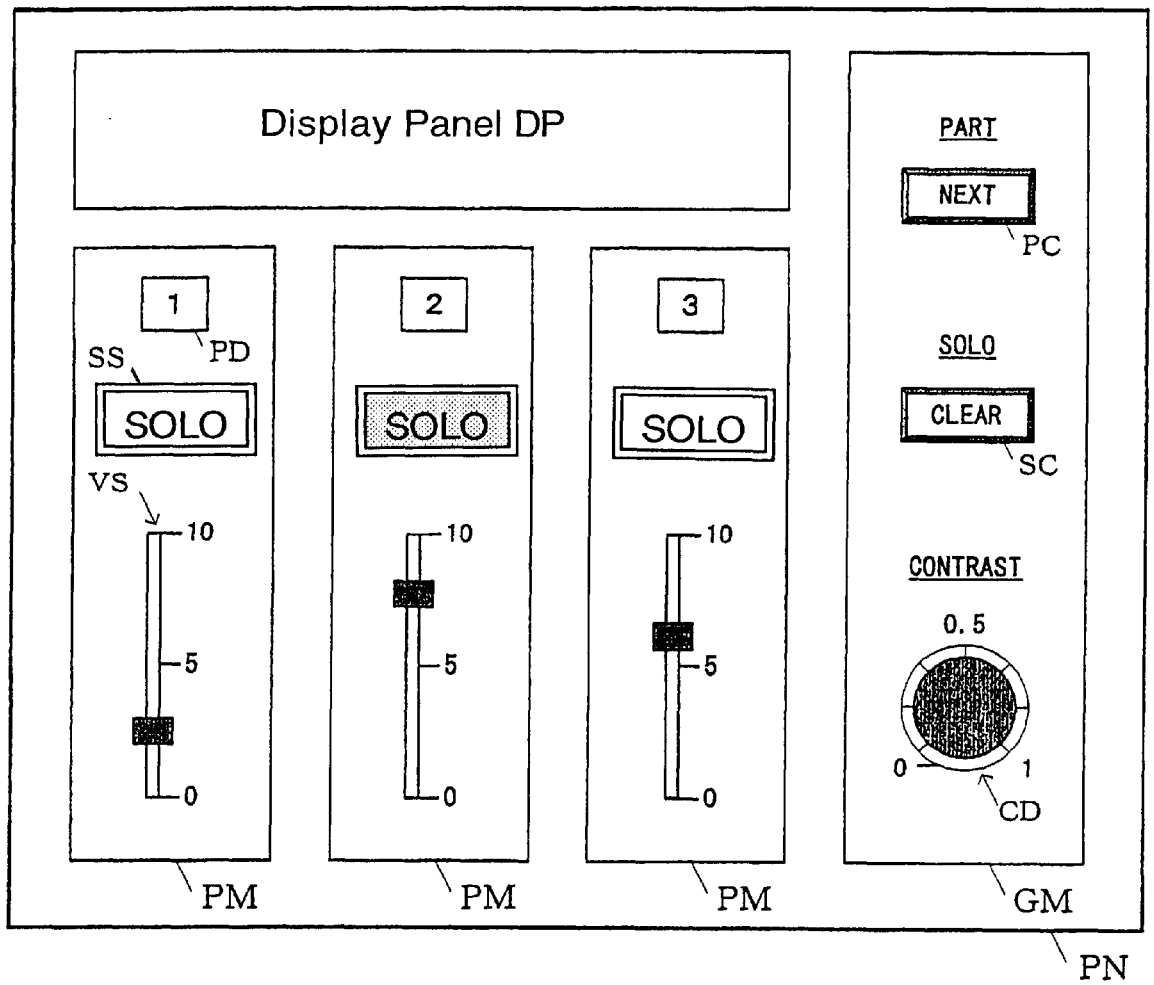
Fig. 2  Panel Arrangement

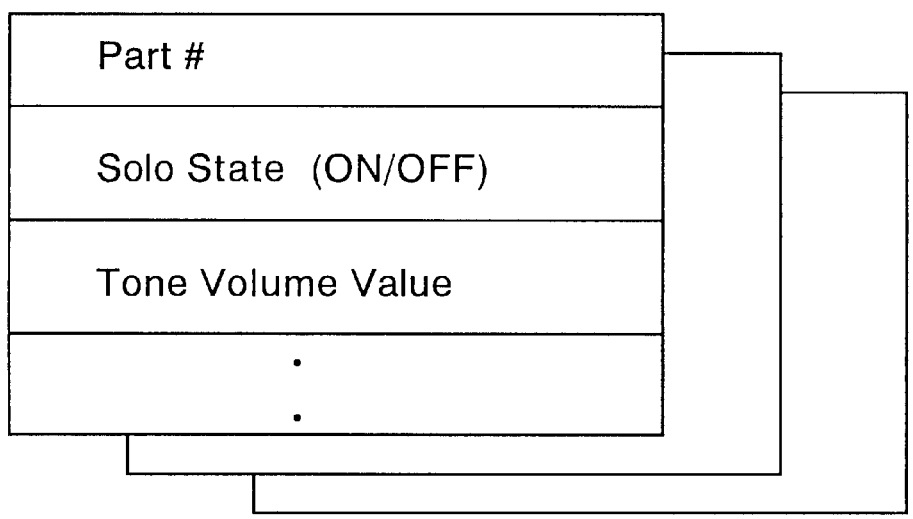
*Fig. 3 Part Parameter Setting Buffer*

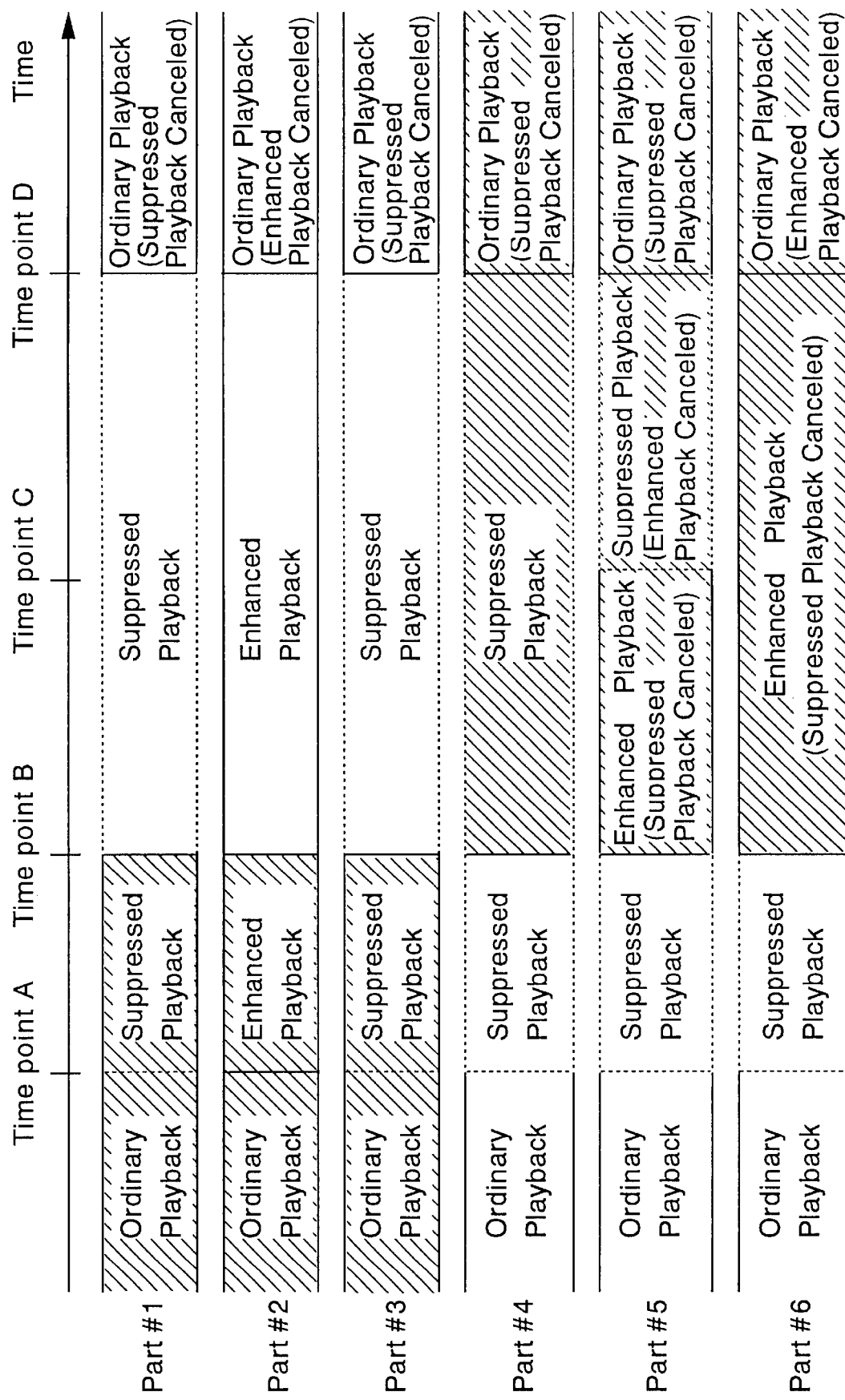
Fig. 4 Playback Transition

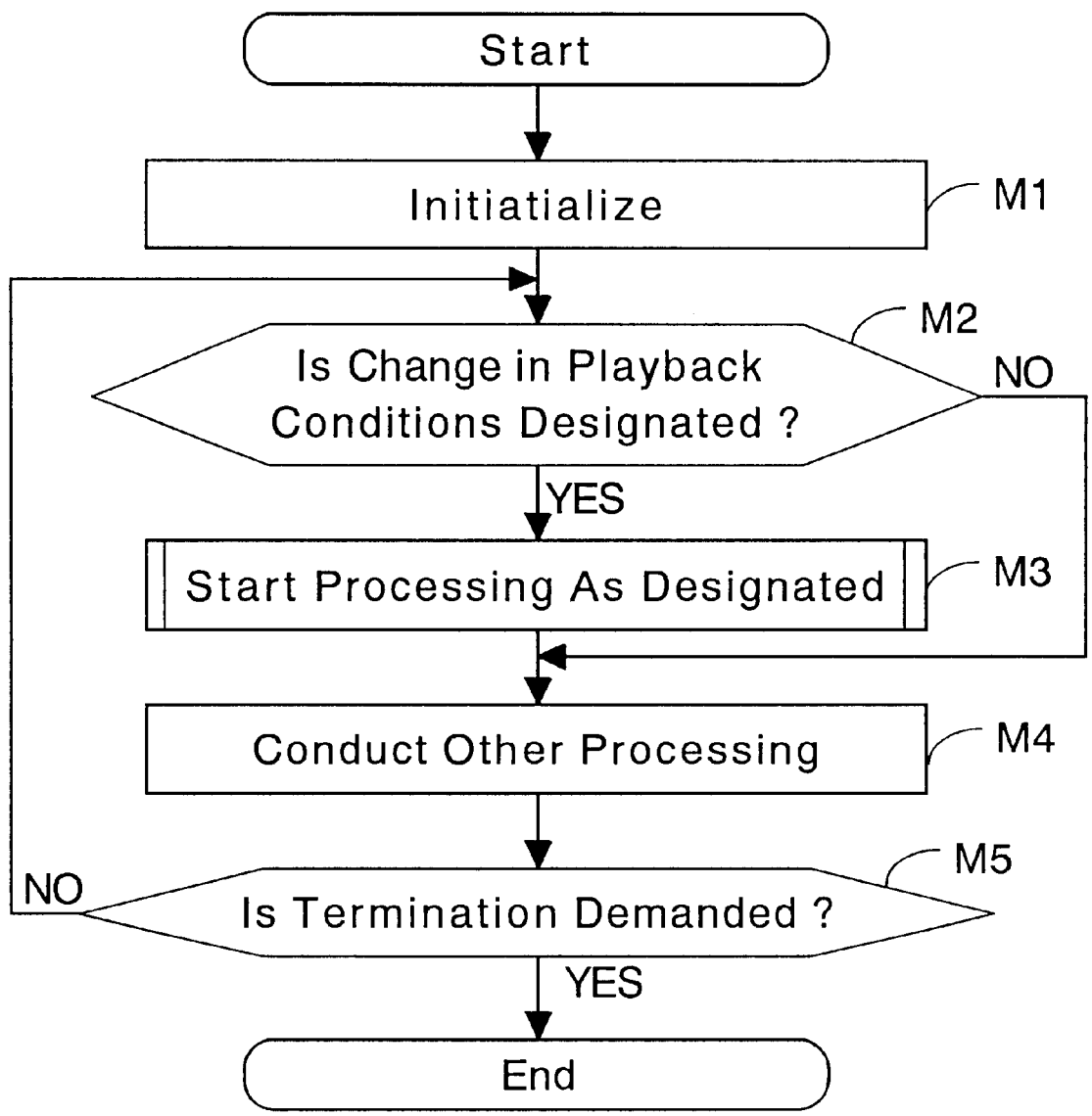
Fig. 5 Main Routine Processing

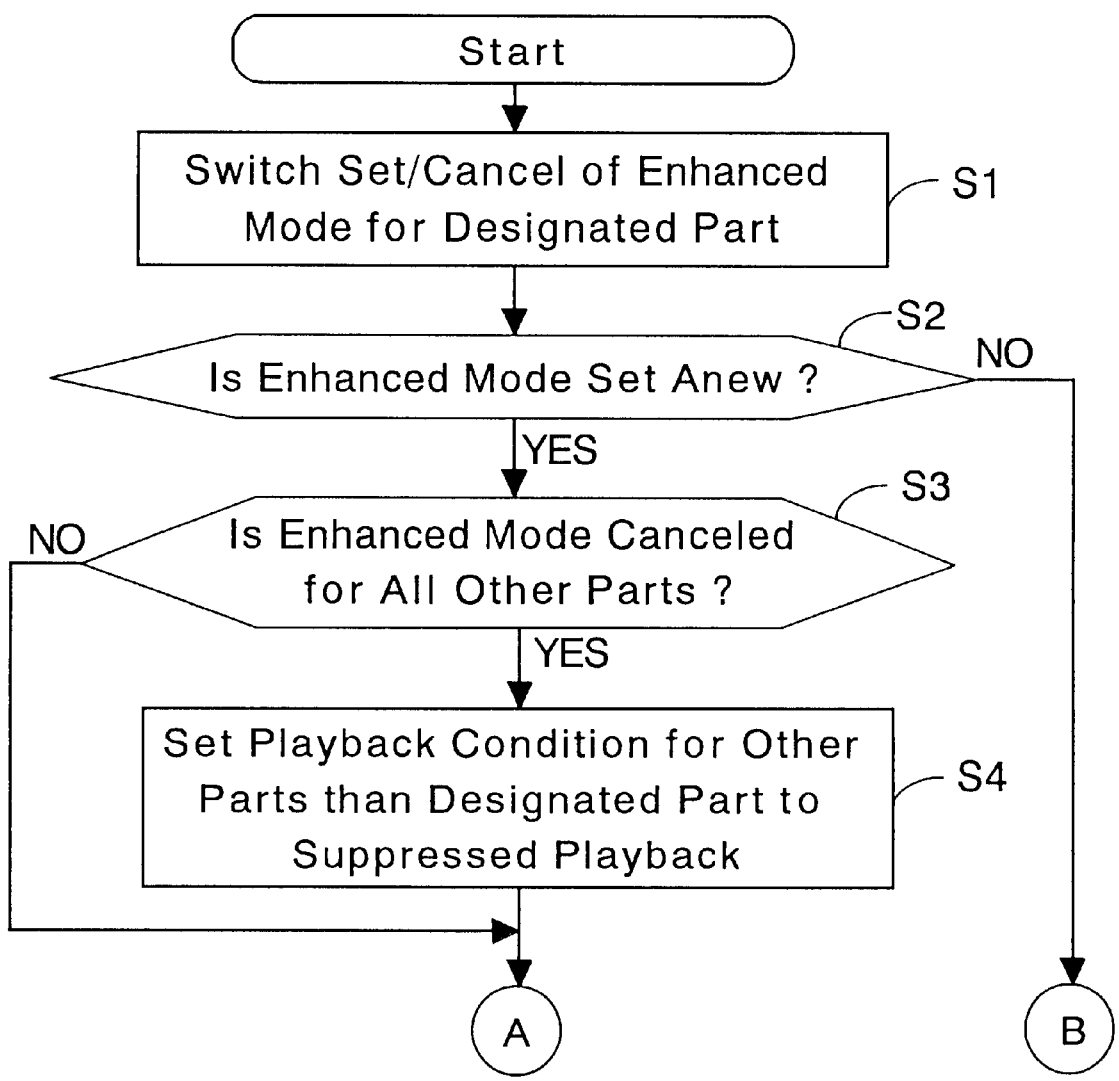
*Fig. 6a Enhanced Mode Processing*

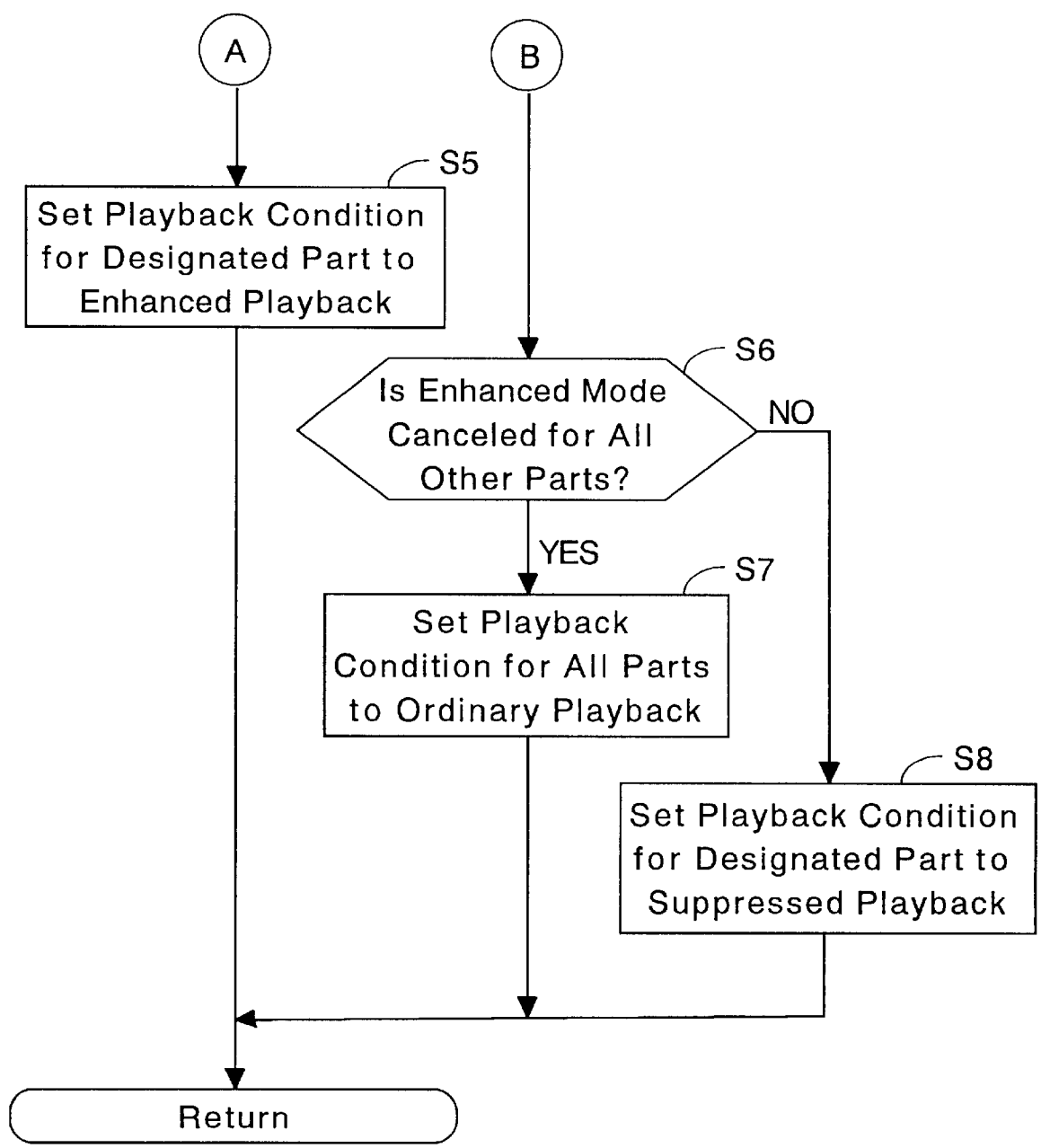
*Fig. 6b Enhanced Mode Processing*

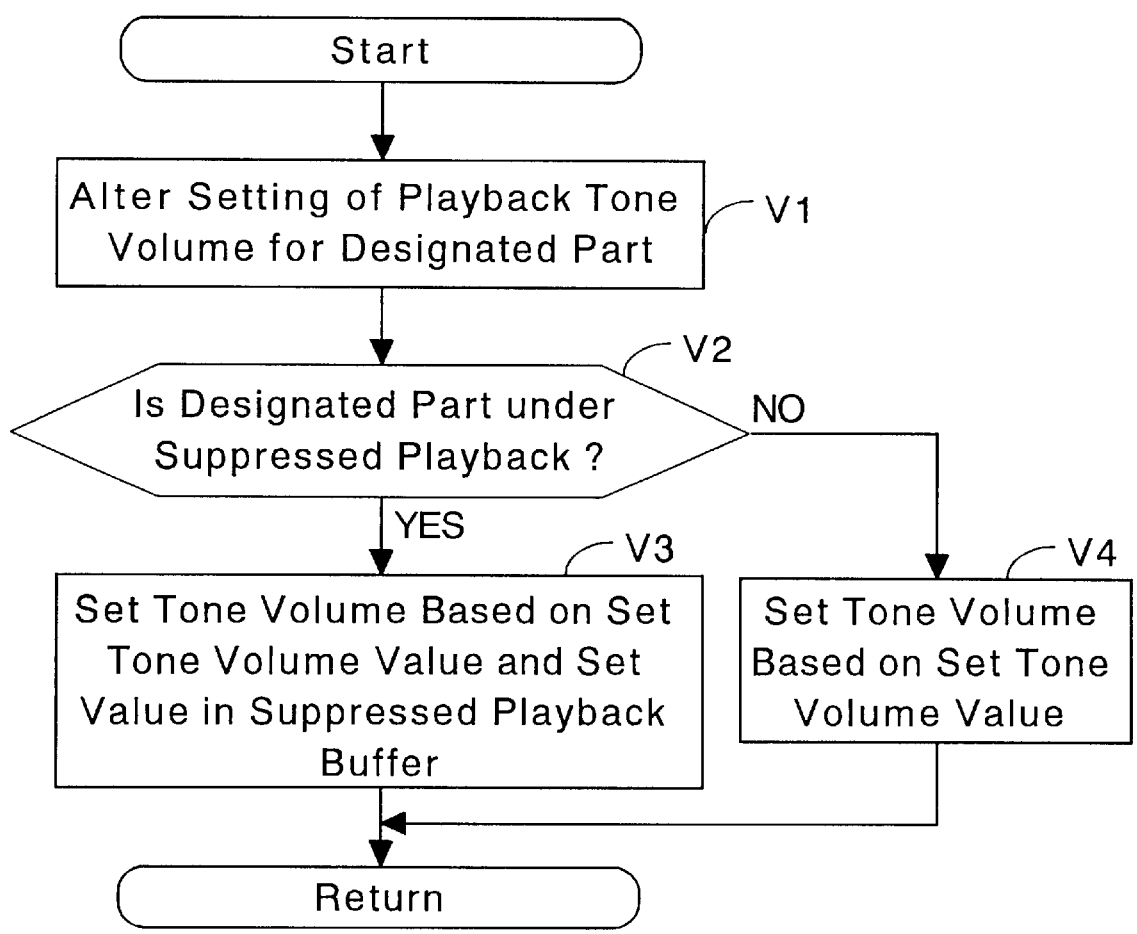
Fig. 7  Tone Volume Set Processing

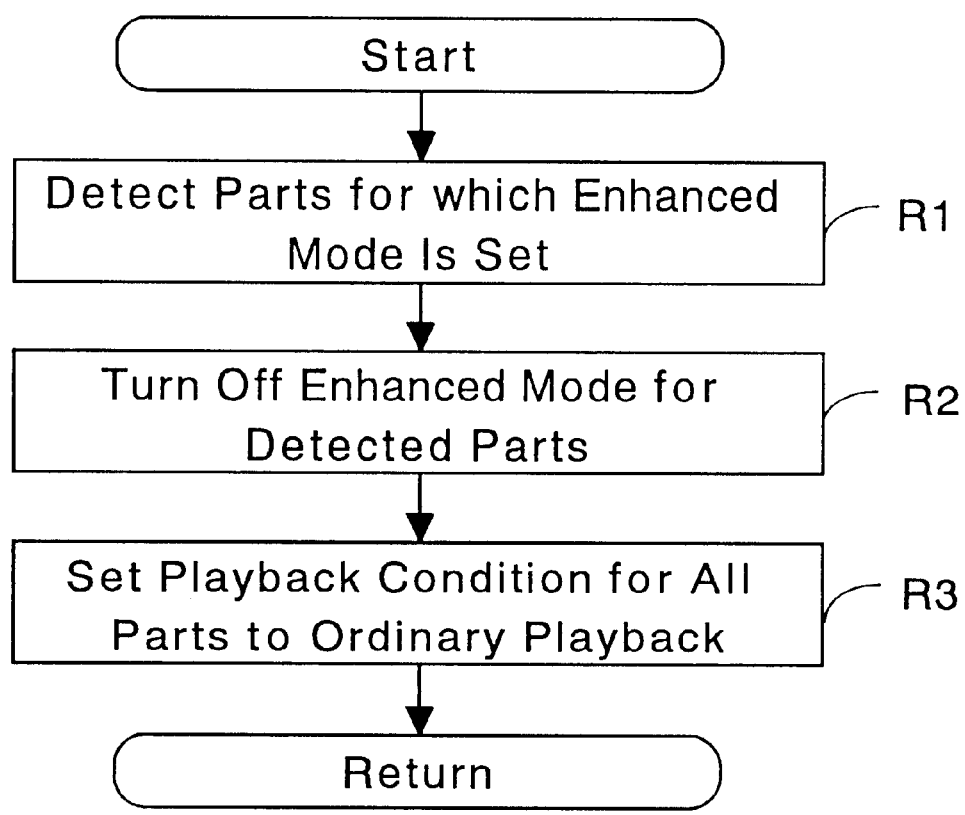
Fig. 8 Batch Cancel Processing

Suppressed Playback Set Processing

*Fig. 10 Part Setting Alter Processing*
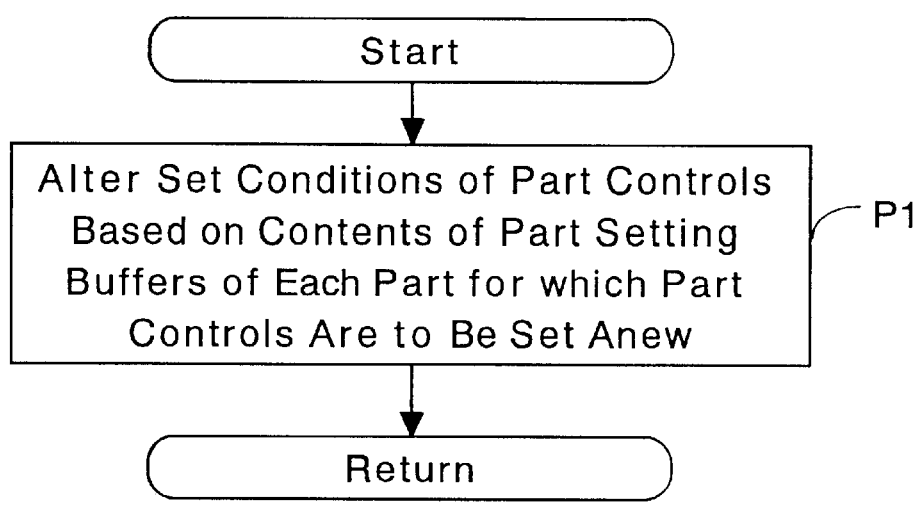

APPARATUS FOR PLAYING MUSIC WITH ENHANCED PART PERFORMANCE AND COMPUTER PROGRAM THEREFOR

BACKGROUND OF THE INVENTION

1. Field of the Invention

The present invention relates to a musical apparatus for playing back music with an enhanced part performance, and a computer program for realizing such an apparatus using a computer system, and more particularly to an apparatus and a method in which particular parts among a plurality of performance parts constituting a consolidated music performance are played back in an enhanced manner in comparison to other parts, which may be referred to as a solo function in the field of electronic musical apparatuses, and such particular parts which are set to be in an enhanced playback mode can be batch-canceled to bring all the performance parts back to an ordinary playback mode by a simple manipulation, for example on a digital mixer or the like apparatuses.

2. Description of the Prior Art

In the field of electronic musical apparatuses such as a digital mixer for playing back music performances, some of such apparatuses are equipped with a so-called "solo function" in which a particular part or parts among a plurality of performance parts constituting a consolidated music performance are played back in an enhanced manner in comparison to other parts. In the conventional apparatuses, however, if a solo function (i.e. an enhanced playback mode) is set for a particular performance part, the remaining performance parts are played back in a muted condition (i.e. a suppressed playback mode).

In conventional apparatuses of this type, the setting and the canceling of the solo function is controlled by a dedicated control switch ("solo switch") provided individually for individual performance parts, and therefore the solo function can be set either for a single performance part or for a plurality of performance parts simultaneously. And if the solo function is set for any (one or more) of the performance parts, other performance parts for which the solo function is not set are played back in a muted condition, i.e. in a decreased tone volume (not necessarily in silence).

With the conventional arrangement, the setting and the cancellation of the solo function have to be rendered individually for each performance part, and accordingly it will take a considerable amount of time to cancel the solo function of all the parts where a plurality of performance parts are set with the solo function. Further, the playback conditions of the performance parts which are not set with the solo function are set forcibly to a predetermined particular state (i.e. a muted state, and this state is common to all the performance parts for which the solo function is not set). Consequently, the user cannot set the playback conditions individually to realize his/her own desirable solo function, for example, by setting the solo part to be recognized in an arbitrarily desirable balance or contrast with respect to all the other parts which are played back concurrently.

SUMMARY OF THE INVENTION

It is, therefore, a primary object of the present invention to solve the above described drawbacks with the conventional apparatus and to provide a novel type of apparatus for playing back music performance signals with an effective solo function in which the solo function individually set for a plurality of performance parts can be batch-canceled by a simple manipulation and the playback conditions of the individual parts can be arbitrarily controlled for the playback with a solo function on a particular part or parts.

According to the present invention, the object is accomplished by providing an apparatus for playing back music with an enhanced part performance comprising: a plurality of part playback channels each of which plays back music performance signals of each assigned part of plural performance parts constituting in combination a consolidated music performance, at least two of the plurality of part playback channels each being capable of playing back the music performance signals of the assigned performance part selectively in an enhanced mode or in an unenhanced mode according to a designated state, the enhanced mode being a mode in which the music performance signals are played back more prominently than in the unenhanced mode; an enhanced mode designating device provided in association with the at least two part playback channels, for selectively designating a set state of the enhanced mode for the associated part playback channel to cause the music performance signals of the assigned part to be played back in the enhanced mode of performance, when the set state is designated, and in the unenhanced mode of performance, when the set state is not designated; and an enhanced mode batch clear designating device which designates cancellation of all of the set states of the enhanced mode for the associated part playback channels, thereby rendering the unenhanced mode of performance in all of the at least two part playback channels.

In an aspect of the present invention, the playback of the music performance signals of the assigned performance part in the enhanced mode may be realized by suppressing the playback of the music performance signals by all other part playback channels than the part playback channel for which the enhanced mode is designated.

In another aspect of the present invention, the suppressing the playback of the music performance signals may be realized by decreasing the tone volume of the music performance signals played back by the other part playback channels.

According to the present invention, the object is further accomplished by providing an apparatus for playing back music with an enhanced part performance comprising: a plurality of part playback channels each of which plays back music performance signals of each assigned part of plural performance parts constituting in combination a consolidated music performance, at least two of the plurality of part playback channels each being capable of playing back the music performance signals of the assigned performance part selectively in an enhanced mode or in an unenhanced mode according to a designated state, the enhanced mode being a mode in which the music performance signals are played back more prominently than in the unenhanced mode; an enhanced mode designating device provided in association with the at least two part playback channels, which device selectively designates a set state of the enhanced mode for the associated part playback channel to render the music performance signals of the assigned part to be played back in the enhanced mode of performance, when the set state is designated, and in the unenhanced mode of performance, when the set state is not designated; and a performance condition controlling device for controlling a condition of the unenhanced mode of performance.

In a further aspect of the present invention, the performance condition controlling device may include first control devices, each provided for each of the at least two part playback channels, for controlling the condition of the unenhanced mode of performance, and a second control device, provided for all of the at least two part playback channels in common, for controlling the condition of the unenhanced mode of performance, whereby the condition of the unenhanced mode of performance may be controlled by the first control device and the second control device in combination.

In a still further aspect of the present invention, the performance condition controlling device may control the condition of the unenhanced mode of performance in common by means of a common control signal.

In a still further aspect of the present invention, the performance condition controlling device may be capable of controlling the condition of the unenhanced mode of performance, while at least one of the part playback channels is playing back the music performance signals in the enhanced mode.

In a still further aspect of the present invention, in case the mode designating device may designate a set state of the enhanced mode anew for a single playback channel among the plurality of playback channels while all the other playback channels may be set under the unenhanced mode, the mode designating device may cause all the other playback channels to play back the music performance signals in a suppressed mode.

In a still further aspect of the present invention, in case the mode designating device may designate a set state of the enhanced mode anew for a single playback channel among the plurality of playback channels while there may be another playback channel which may be set under the enhanced mode, the mode designating device may cause the single playback channel to play back the music performance signals in the enhanced mode.

In a still further aspect of the present invention, the performance condition controlling device may decrease the tone volume of the music performance signals played back by the associated part playback channel.

According to the present invention, the object is further accomplished by providing a computer program containing program instructions executable by a computer and causing the computer to execute: a process of providing a plurality of part playback channels each of which plays back music performance signals of each assigned part of plural performance parts constituting in combination a consolidated music performance, at least two of the plurality of part playback channels each being capable of playing back the music performance signals of the assigned performance part selectively in an enhanced mode or in an unenhanced mode according to a designated state, the enhanced mode being a mode in which the music performance signals are played back more prominently than in the unenhanced mode; a process of selectively designating a set state of the enhanced mode for each of the at least two part playback channels to cause the music performance signals of the assigned part to be played back in the enhanced mode of performance, when the set state is designated, and in the unenhanced mode of performance, when the set state is not designated; and a process of clearing all of the set states of the enhanced mode for the associated part playback channels, thereby rendering the unenhanced mode of performance in all of the at least two part playback channels.

According to the present invention, the object is further accomplished by providing a computer program containing program instructions executable by a computer and causing the computer to execute: a process of providing a plurality of part playback channels each of which plays back music performance signals of each assigned part of plural performance parts constituting in combination a consolidated music performance, at least two of the plurality of part playback channels each being capable of playing back the music performance signals of the assigned performance part selectively in an enhanced mode or in an unenhanced mode according to a designated state, the enhanced mode being a mode in which the music performance signals are played back more prominently than in the unenhanced mode; a process of selectively designating a set state of the enhanced mode for each of the at least two part playback channels to cause the music performance signals of the assigned part to be played back in the enhanced mode of performance, when the set state is designated, and in the unenhanced mode of performance, when the set state is not designated; and a process of controlling a condition of the unenhanced mode of performance.

As will be understood from the above description about the apparatus for playing back music with an enhanced part performance comprising, a sequence of the steps each performing the operational function of each of the structural elements of the above apparatuses will constitute a method for playing back music with an enhanced part performance according to the spirit of the present invention.

As will be apparent from the description herein later, some of the structural element devices of the present invention are configured by a computer system performing the assigned functions according to the associated programs. They may of course be hardware structured discrete devices. Therefore, a hardware-structured device performing a certain function and a computer-configured arrangement performing the same function should be considered a same-named device or an equivalent to each other.

BRIEF DESCRIPTION OF THE DRAWINGS

For a better understanding of the present invention, and to show how the same may be practiced and will work, reference will now be made, by way of example, to the accompanying drawings, in which:

FIG. 1 is a block diagram illustrating the hardware configuration of a playback system (digital mixer) according to an embodiment of the present invention;

FIG. 2 is a front view of a panel arrangement for controlling the playback system (digital mixer) according to an embodiment of the present invention;

FIG. 3 is a chart showing the data structure of a part parameter setting buffer according to an embodiment of the present invention;

FIG. 4 is a chart showing an example of the transition of playback modes in an embodiment of the present invention;

FIG. 5 is a flow chart describing the main routine processing executed in the playback system (digital mixer) according to an embodiment of the present invention;

FIGS. 6a and 6b are, in combination, a flow chart describing an example of enhanced mode processing executed as a subroutine for a step M3 in the main routine of FIG. 5;

FIG. 7 is a flow chart describing an example of tone volume set processing executed as a subroutine for the step M3 in the main routine of FIG. 5;

FIG. 8 is a flow chart describing an example of batch cancel processing executed as a subroutine for the step M3 in the main routine of FIG. 5;

FIG. 10 is a flow chart describing an example of part setting alter processing executed as a subroutine for the step M3 in the main routine of FIG. 5.

DESCRIPTION OF THE PREFERRED EMBODIMENTS

Figure 9:
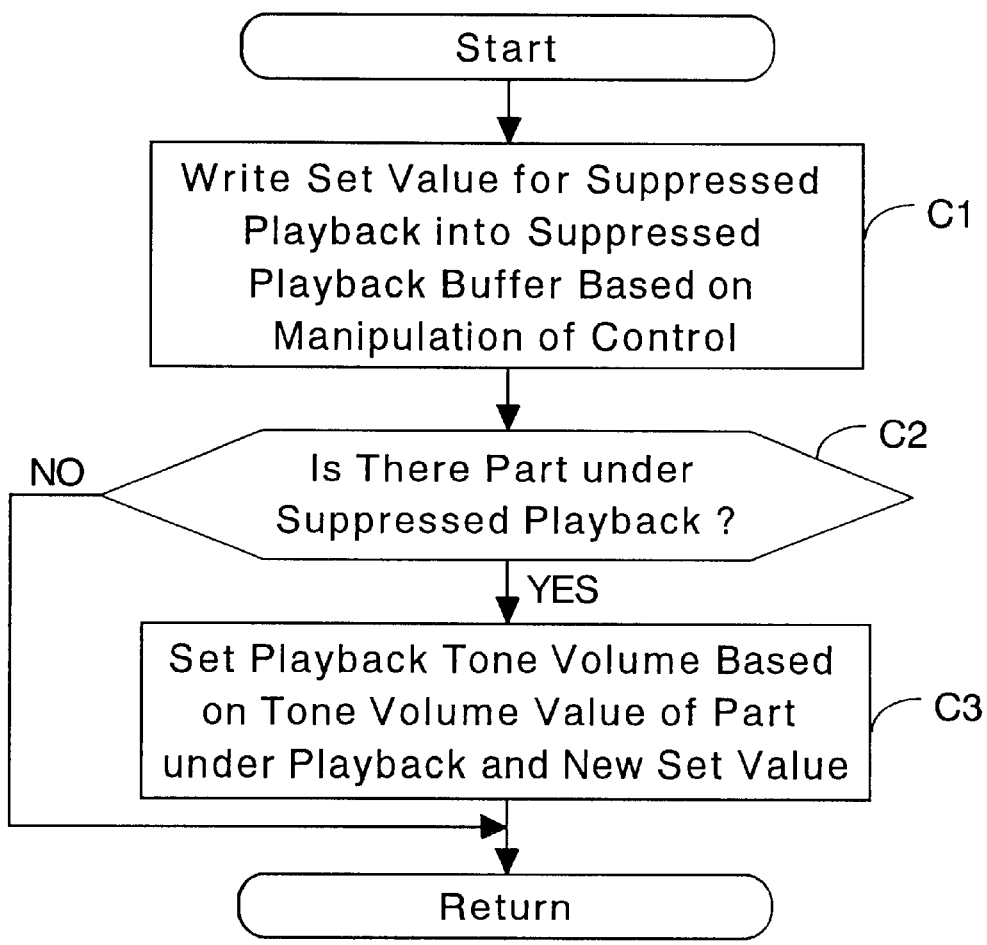
FIG. 9 is a flow chart describing an example of suppressed playback set processing executed as a subroutine for the step M3 in the main routine of FIG. 5.

Referring the accompanying drawings, a preferred embodiment of the present invention will be described in detail hereinbelow. It should, however, be understood that the illustrated embodiment is intended just for a practical example and not for limiting the scope of the present invention, and that various modifications may be made without departing from the spirit of the present invention.

Hardware Configuration

FIG. 1 is a block diagram illustrating the hardware configuration of a playback system (digital mixer) according to an embodiment of the present invention. The system is configured with a digital mixer incorporating an automatic music performance function and conducting the playback mode control processing. The system comprises a central processing unit (CPU) 1, a timer 2, a read-only memory (ROM) 3, a random access memory (RAM) 4, an external storage device 5, a detecting circuit 6, a display circuit 7 and a sound system 8 together with a communication interface 9 and a transmitter-receiver circuit 10, all of which are connected with each other by means of a bus 11.

The CPU 1 controls the entire system including various controls according to the associated software programs under the clock signal from the timer 2, and more particularly conducts the processing for controlling the playback mode as well as the regular mixer operation. The ROM 3 stores the control programs necessary for controlling the system, including programs for the regular mixer operation and programs for controlling the playback mode, and various tables and data associated with such processing.

The RAM 4 stores the various information including flags and buffers used in such processing. For example, a part parameter setting buffer is provided in the RAM 4 to temporarily store the information representing the set conditions of the individual performance parts, and a suppressed playback parameter buffer is also provided to temporarily store the various set values for the suppressed playback mode.

The external storage device 5 may be a hard disk drive and may be any other type of storage device utilizing a portable storage medium such as a compact disk read-only memory (CD-ROM), a floppy disk (FD), a magneto-optical (MO) disk, a digital versatile disk (DVD), and a memory card. The external storage device 5 is capable of storing various control programs and various data. Therefore, various control programs and various data may not only be stored in the ROM 3, but may also be transferred from the external storage device to the RAM 4. The external storage device 5 may also serve to store the processed data.

The detecting circuit 6 is connected to various controls 12 including switches and adjusters (such as a dial and a slider) for the mixing operation and for playback operation to detect the user's designations, and the controls 12 are arranged on a control panel PN as shown in FIG. 2. The display circuit 7 is connected to a display device 13 including a display panel DP and various indicators also arranged on the control panel PN.

The sound system 8 includes a digital signal processor (DSP), an output amplifier and a loudspeaker, and is comprised of a plurality of part playback channels (or may be referred to as "tracks") each of which plays back music performance signals of each assigned part of plural performance parts constituting in combination a consolidated music performance. Where the musical signals are digital audio signals, a digital-to-analog converter will be used to playback musical tones, and where the musical signals are MIDI signals, the signals will be supplied to a tone generator circuit to produce musical tones. The communication interface 9 is connected to a communication network 14 such as a local area network (LAN), Internet and a telephone line, so that control programs and musical performance data and so forth may be obtained from a server computer or the like via the communication network 14 to store in the external storage device 5.

The transmitter-receiver circuit 10 is equipped with input/output terminals in a number necessary for the individual part playback channels to transmit music performance signals to external apparatuses 15 and to receive music performance signals from the external apparatuses 15. An external apparatus 15 which is connected to the input/output terminals of the transmitter-receiver circuit 10 for the individual part playback channels is an apparatus which is capable of transmitting and receiving musical signals such as digital or analog audio signals and MIDI signals to play back musical tones, and may be an audio apparatus, an electronic musical instrument and an automatic music performing apparatus.

Panel Arrangement

FIG. 2 is a schematic illustration of an example of the arrangement of a control panel for controlling the playback system according to an embodiment of the present invention. On the control panel PN of the mixer console are arranged a display panel (or screen) DP and various controls such as switches, sliders and a dial adjuster. Among the controls, there are plural sets (in a number m corresponding to the controllable individual part playback channels at a time) of part controls PM, each for controlling each assigned part playback channel individually, and a set of general controls GM for controlling all the part playback channels in common. In the example, the number m of sets of part controls PM is designed to be less than the number n of all the part playback channels (i.e. mixing parts), that is to say, m<n, in order to reduce the area on the control panel PN. The explanation hereunder will be made with respect to an example where there are six (6) part playback channels, i.e. the number n of all the mixing parts is six (6).

In the illustrated embodiment, there are provided on the panel PN three sets (m=3) of part controls instead of six sets (n=6) for all the mixing parts, i.e. part playback channels. These three sets can be alternately allotted to the first three parts and to the second three parts by a part change (shift) switch in two shifts for controlling the playback conditions of the allotted channel.

The display panel (screen) DP exhibits various information relative to the part mixing and the part playback conditions, such as the conditions with respect to the tone signals being played back and the mode setting conditions for the respective parts.

Each set of part controls PM includes a part indicator PD, a solo switch SS, a tone volume control slider VS, and so forth. The part indicator PD indicates the part (channel) to which the set of part controls PM is concurrently allotted and of which the conditions are controlled by the set of part controls PM.

The solo switch SS is a push-push switch of the type which alternately change the switch-on state and the switchoff sate as well as the lamp-on state and the lamp-off state according to each pushing manipulation, for example, a push button switch with a lamp installed in the button. The solo switch SS is for setting and canceling the solo function (the enhanced playback mode) with respect to the allotted part. Namely, the solo switch SS alternates the set state and the canceled state every time the switch SS is manipulated. At the set state, the button of the solo switch SS is illuminated with the installed lamp as showing in FIG. 2, at part #2 as indicated by the part indicator PD.

The tone volume control slider VS is provided to set the playback tone volume of the assigned part to be controlled, wherein the slider knob moved to the position of "10" renders the maximum tone volume and the slider knob moved to the position of "0" renders the minimum (zero) tone volume.

The set of general controls GM includes controls for determining the overall playback conditions common to all the parts, and they are, from top to bottom, a part change switch PC, a solo clear switch SC, a contrast dial CD, and so forth. The part change switch PC is to switch over the allotment of the first three parts and the second three parts to the three sets of part controls PM. In the illustrated embodiment of FIG. 2, the group of parts #1 through #3 or the group of parts #4 through #6 will be selectively allotted to the three sets of part controls PM, respectively, every time the part change switch PC is manipulated.

The solo clear switch SC is provided to batch-cancel the solo functions (or enhanced playback modes) which have been set for a plurality of performance parts. The contrast dial CD is provided to control the playback conditions of the parts for which the solo functions are not set (i.e. unenhanced mode conditions) where the solo function is set for any of the parts. The control range is from "0" to "1". The tone signal volume value of the part for which the solo function is not set is multiplied by the value of the contrast dial CD, and the multiplication product determines the playback condition (tone volume) of the unenhanced (or suppressed) part.

Part Parameter Setting Buffer

In the RAM 4 of the playback system are provided areas for part parameter setting buffers for the respective parts individually. The part parameter setting buffer is a buffer which stores the parameters such as an on/off state of the solo function and a tone volume value which are set for determining the playback conditions of each assigned part. FIG. 3 shows an example of the data structure of the part parameter setting buffer, and stores data such as the part number, the solo function on/off state and the tone volume value.

The part number is the data representing the part identification number for which the parameters are stored in the buffer, the solo function on/off state is the data representing whether the solo function is set or canceled for the part, and the tone volume value is the data representing in a numerical value the tone volume value which is set for the part. Other than these parameters, the part parameter setting buffer further contains data representing whether a mute function is set or canceled for the part.

The parameters stored in the part parameter setting buffer are renewed every time any of the controls in the part control set PM or the general control set GM on the control panel PN is controlled, and the solo function on/off state and the tone volume value are modified based on the contents of the manipulation. When the allotted group of playback parts are switched to the other group by the part change switch PC, the parameters representing the various set conditions are read out from the part parameter setting buffer of the newly allotted parts and are reflected on the respective sets of part controls PM.

Playback Mode Transition

FIG. 4 shows an example of the transition of playback modes with respect to time for the individual parts in an embodiment of the playback system according to the present invention. In this example of the playback system, the mixer comprises six mixing parts, and the musical data (musical tone signals) are assumed to be inputted from the external apparatuses to all of the six parts via the transmitter-receiver circuit 10. The hatched portions indicate the part or channel which are allotted to the sets of part controls PM on the control panel PN. In FIG. 4, the parts #1 through #3 are allotted to the three sets of part controls PM until the time point B, while the parts #4 through #6 are allotted to the three sets of part controls PM from the time point B and thereafter.

Hereinafter will be described one of the characteristic features of the playback system according to the present invention in brief outline using FIG. 4. In this playback system, the playback conditions of the musical signals of a plurality of playback parts (six parts from #1 through #6 in FIG. 4) are controlled. If the solo function (i.e. the playback in the enhanced mode) is set for one (#2) of the parts by the manipulation of the solo switch SS (at time point A), only the musical signals of that particular part (#2) are played back in an enhanced mode, while the musical signals of other parts (#1, #3–#6) are played back in an unenhanced mode. When the contrast dial CD is manipulated or adjusted to determine the tone volume for the unenhanced mode playback, the tone volumes for the other parts #1, #3–#6 are set according to the manipulation of the contrast dial CD. Where the solo functions are set for a plurality of parts (#2 and #6 between time points C and D), if the solo clear switch SC is manipulated to cancel the solo function (at time point D), the solo functions for the parts #2 and #6 are batch-canceled, or canceled simultaneously by the simple operation.

(1) Up to Time Point A

In FIG. 4, up to the time point A, all of the six performance parts of the music are played back in an ordinary playback mode, and no part is played back in an enhanced playback mode, that is to say, a solo function is not set for any part. In the ordinary playback mode, the part is played back according to the condition (e.g. tone volume value) set for the part by means of the tone volume slider VS among the part controls PM or the like.

"To play back" herein includes to play back the music signals for each performance part as inputted from the external apparatus 15 via the transmitter-receiver circuit 10 in a playback mode whose conditions are determined by the contents registered in the part parameter setting buffer, either as audible sounds in the air using the sound system 8 or as tone signals outputted externally using the communication interface 9 or the transmitter-receiver circuit 10.

(2) Between Time Point A and Time Point B

According to the manipulation of the solo switch SS for the part #2 at the time point A, the part #2 is set to start playback in an enhanced mode, and the remaining parts #1 and #3 through #6 are set to start playback in a suppressed mode, as there has been no part running in the enhanced mode when the solo switch for the part #2 is manipulated. Thus, between the time point A and the time point B, the part

2 which is played back in an enhanced mode is played back with a tone volume as set by the tone volume slider VS or the like for the part #2. Other than the part #2, the parts #1, #3 through #6 are played back in a suppressed playback mode with the tone volume which is determined by the set value as set by the contrast dial CD among the general controls GM.

(3) Between Time Point B and Time Point C

As the part change switch PC is manipulated at the time point B, the parts #4 through #6 are now respectively allotted to the three sets of part controls PM on the panel PN, and then the solo switch SS for the parts #5 and #6 are additionally manipulated also at the time point B, the parts #5 and #6 are canceled from the suppressed mode and are set to start playback in the enhanced mode. As there has been another part (i.e. part #2) running in the enhanced mode when the solo switches for the new parts (i.e. parts #5 and #6) are manipulated, the playback conditions of the other parts than the newly designated parts #5 and #6 are unchanged. Thus, between the time point B and the time point C, the parts #5 and #6 are played back in the enhanced mode with the tone volumes respectively set for the parts #5 and #6 by the part controls PM, while the part #2 continues the playback in the enhanced mode, and the parts #1, #3 and #4 continue the playback in the suppressed mode.

(4) Between Time Point C and Time Point D

As the solo switch SS is manipulated for the part #5 at the time point C, the part #5 which has been in the enhanced mode playback is now canceled from the enhanced mode. The playback mode of the part #5 is now set to be the suppressed mode, as there are other parts (i.e. #2 and #6) running in the enhanced mode. The playback conditions of the other parts than the newly designated part #5 are unchanged. Thus, between the time point C and the time point D, the parts #2 and #6 are played back in the enhanced mode, while the parts #1 and #3 through #5 are played back in the suppressed mode.

(5) After Time Point D

As the solo clear switch SC among the general controls GM is manipulated at the time point D, the enhanced modes which have been set for the parts #2 and #6 are batch-canceled. With this cancellation, all the parts (i.e. playback channels) are set to the ordinary playback mode and are played back with the tone volumes respectively set for the individual parts. As the part parameter setting buffer carries such data, not only the parts (i.e. #4 through #6) concurrently allotted to the groups of part controls PM on the control panel PN, but also the parts (i.e. #1 through #3) not concurrently allotted to the controls PM on the control panel PN are set to the ordinary playback mode with the respective tone volumes. Namely, both the enhanced modes which have been set for the parts #2 and #6 and the suppressed modes which have been set for the parts #1 and #3 through #5 are canceled simultaneously.

Although the above description about the playback mode transition is made with the tone volume sliders VS of the respective parts are not adjusted individually during the course of the performance transition, the tone volume sliders VS may be adjusted in mid course of playback, and if the tone volume slider VS of the part which is in the enhanced mode playback is adjusted, the part will be played back in an enhanced mode with the tone volume as newly adjusted, and if the tone volume slider VS of the part which is in the suppressed mode playback is adjusted, the part will be played back in the suppressed mode with the tone volume based on the tone volume as determined based on both the value newly adjusted by the tone volume slider VS in the part controls PM and the value set by the contrast dial CD in the general controls GM.

Main Routine Processing

FIG. 5 is a flow chart describing the main routine processing executed in the playback system (digital mixer) according to an embodiment of the present invention. The flow chart represents the fundamental operations which are running from the startup till the shutdown of the system.

As the power is supplied to the system and the main routine processing starts, the initialization of the system takes place at the first step M1. In the initialization step, an assignment initialization process takes place to assign the parts #1 through #3 to the three groups of part controls PM on the control panel PN, and a part initialization process takes place to initialize the contents of the part parameter setting buffer on the RAM 4 with respect to all the parts, and so on. The part initialization process includes the process of setting the solo state at "off" and setting the tone volume value at a predetermined initial value.

Next, a step M2 judges whether there is any designation as to the change in playback conditions. The designations of changes in playback conditions include the setting or canceling of the solo function for each part (manipulation of the solo switch SS), the setting of the tone volume value for each part (manipulation of the tone volume slider VS), the switching of the part allotment to the part control group PM (manipulation of the part change switch PC), the batch-cancellation of the solo functions (manipulation of the solo clear switch SC) and the setting of the playback conditions for the parts for which the solo function is not set while the solo function is set for any other part (manipulation of the contrast dial CD).

If the step M1 judges that there is any change in playback conditions designated according to the player's manipulation, a step M3 starts the processing corresponding to the designation. The step M3 is called "playback condition controlling processing." After the designated processing has been performed, the process moves forward to a step M4. Where there is no change in playback conditions designated, the process flow skips the step M3 and directly goes to the step M4 from the step M2. The step M4 conducts other processing, including assignment setting processing which changes musical tone signals to be assigned to a part, start/stop processing of the internal automatic performance operation, muting processing. The assignment setting processing is to determine which signals as inputted from which terminal are assigned to which performance part (playback channel), and to which of the performance parts the respective parts of the performance data as played back by the internally provided automatic music performance device, and so forth. The muting processing is activated according to the manipulation of a mute switches (not shown) provided for individual parts and is operated independently from the solo function.

After the processing of the step M4 is done, the process goes forward to a step M5 to judge where there is the termination of the system operation designated, and as long as the termination is not designated, the process goes back to the step M2 to repeat the process sequence of the steps M2-M5 until the termination is designated. Upon designation of termination, the main routine processing comes to an end.

Playback Condition Controlling Processing

At the step M3 in the main routine processing, subroutine process of various kinds of playback condition controlling processing are electively performed according to the designation with respect to changes in the playback conditions. Among these playback condition controlling processing, there are enhanced mode processing which realizes the solo function in the apparatus (FIGS. 6a–6b), tone volume setting processing (FIG. 7), batch cancel processing (FIG. 8), suppressed playback set processing (FIG. 9), and part setting alter processing (FIG. 10).

(1) Enhanced Mode Processing for Solo Function:

FIGS. 6a and 6b are, in combination, a flow chart describing an example of enhanced mode processing executed as a subroutine for a step M3 in the main routine of FIG. 5, when the solo function is set or canceled at any of the part, i.e. the playback channels. This enhanced playback mode processing is activated when a solo switch is manipulated at any of the performance part on the control panel PN. As the processing flow starts, a first step S1 switches over the set/cancel conditions from one to the other of the designated part. Namely, where the solo function has been set "ON" at the part for which the solo switch SS is manipulated, the step S1 turns to "OFF" state, and where the solo function has been set "Off", the step S1 turns to "ON" state. With this process, the content of the solo state in the part parameter setting buffer is rewritten, and accordingly the lamp state is changed (illuminated or extinguished).

Then, a step S2 judges whether there is an enhanced mode set anew at any of the parts, and if the present manipulation of the solo switch SS is the solo function setting designation (YES), the process moves forward to a step S3 to judge whether the enhanced mode is canceled for all other parts.

When the step S3 judges that all the other parts are canceled from the enhanced mode (YES), that is to say, there is no other part that is set with the enhanced playback mode, it means that it is a new set designation of the solo function, and therefore the process goes forward to a step S4 to set the playback conditions for all the parts other than the solo function-designated part to the suppressed playback mode before moving to a step S5 (FIG. 6b). The step S5 sets the playback condition for the designated part to an enhanced mode. After the process of the step S5 is finished, the subroutine flow of the enhanced mode processing ends, and the process flow returns to the main routine (FIG. 5) at the step M4.

When the step S3 judges that not all the other parts are canceled from the enhanced mode (NO), that is to say, there is some other part or parts which are set with the enhanced playback mode, it means that there is already a part or parts under the enhanced playback mode. And therefore, at this time, the process of S5 is conducted with respect to the designated part to set the playback condition of the designated part to be the enhanced mode, keeping the other parts than the designated one at their existing conditions. The process flow then returns to the main routine processing, at the step M4.

On the other hand, if the step S2 judges that the process conducted at the preceding step S1 is not a new setting of the enhanced mode (NO), namely if it is a cancellation of the enhanced mode, the process goes to a step S6 (FIG. 6b) to judge whether the enhanced mode is canceled for all other parts. If all the other parts are canceled from the enhanced mode (YES), that is to say, there is no other part that is set with the enhanced playback mode, it means that this designation (the manipulation as detected by the step M2) is the manipulation for canceling the last existing enhanced mode and the solo function is to be terminated, and thus the process goes forward to a step S7 to set the playback conditions for all the parts to the ordinary playback mode before returning to the main routine, at the step M4.

If there is still any part or parts remaining under the enhanced mode, that is, if the step S6 judges "NO", the process goes to a step S8 to set the playback condition for the now designated part to a suppressed playback mode. After the process at the step S8 is finished, the process returns to the main routine, at the step M4.

(2) Tone Volume Set Processing

FIG. 7 is a flow chart describing an example of tone volume set processing executed as a subroutine for the step M3 in the main routine of FIG. 5, when there is a designation of an alteration in the playback tone volume which is set for any of the parts or playback channels. The tone volume set processing is activated, when a tone volume slider VS is manipulated at any performance part on the control panel PN. As the process flow is started, a first step V1 alters the setting of the playback tone volume for the designated part. In this set alteration process, the tone volume value in the part parameter setting buffer of the designated part is rewritten to a newly designated value (altered value).

A next step V2 judges whether the designated part is now under the suppressed playback mode or not. If the designate part is now under the suppressed mode (YES), the process moves forward to a step V3, and if not (NO), to a step V4. The step V3 sets a tone volume based on the set tone volume value and the set value in the suppressed playback buffer, and the step V4 sets a tone volume based on the tone volume value as set by the tone volume slider VS. After the tone volume set process at either of the steps V3 and V4, the subroutine flow of the tone volume set processing is ended, and the process flow returns to the main routine (FIG. 5), at the step M4.

As a result, if the designated part is under playback in the suppressed mode, that is to say, when the step V2 judges "YES", the playback tone volume for the part (i.e. channel) is determined by a value which is the multiplication product of the tone volume value as newly set by the tone volume slider VS and the set value for the suppressed mode as designated by the contrast dial CD. On the other hand, if the designated part is not under playback in the suppressed mode, that is to say, when the step V2 judges "NO", the part is under playback in either the enhanced mode or the ordinary mode, and therefore the part is played back in a tone volume as newly set by the tone volume slider VS at the step V4.

(3) Batch Cancel Processing

FIG. 8 is a flow chart describing an example of batch cancel processing executed as a subroutine for the step M3 in the main routine of FIG. 5, when a batch cancellation of the enhanced modes are designated by the user. The batch cancel processing is activated, when the solo clear switch SC among the general controls GM on the control panel PN.

As this process flow is started, a first step R1 detects all the parts that are set to be in the enhanced mode. The detection of the parts in the enhanced modes is conducted also with respect to the parts which are not now allotted to the part controls PM on the control panel PN.

A next step R2 turns off the enhanced mode of the parts detected at the step R1, and then a step R3 sets the playback conditions for all the parts (i.e. channels) to the ordinary playback mode. Thus finishing the batch cancel processing, the process flow returns to the main routine (FIG. 5), at the step M4.

(4) Suppressed Playback Set Processing

FIG. 9 is a flow chart describing an example of suppressed playback set processing executed as a subroutine for the step M3 in the main routine of FIG. 5, when the playback condition for the suppressed playback mode is set for the parts other than the part in the enhanced mode while the enhanced mode playback is running. The suppressed playback set processing is activated when the contrast dial CD is manipulated among the general controls GM on the control panel PN.

As this processing flow is started, a first step C1 writes the value controlled by the manipulation of the contrast dial CD into the suppressed playback buffer as the set value for the suppressed playback. The set value for the suppressed playback mode can be controlled, whether or not the solo function is activated to render the enhanced mode. And when the contrast dial CD is manipulated where the solo function is rendered active, the heretofore set playback condition (e.g. playback tone volume) of the part being played back in the suppressed mode is altered (modified) based on the value newly set (controlled) by the manipulation.

A next step C2 judges whether there is any part which is under playback in the suppressed mode. Where there is a part which is running in the suppressed playback mode (YES), a step C3 determines a tone volume value based on the tone volume value of the part presently running in the suppressed mode and on the new tone volume value as designated by the contrast dial CD, and thus determined tone volume value is set as the playback tone volume of the running part (or channel). After the playback tone volume is set at the step C3, or when the step C2 judges that there is no part running in the suppressed mode (NO), the suppressed playback set processing is ended and the process flow returns to the main routine processing (FIG. 5), at the step M4.

(5) Part Setting Alter Processing

FIG. 10 is a flow chart describing an example of part setting alter processing executed as a subroutine for the step M3 in the main routine of FIG. 5, when a set of parts (channels) to be allotted to the part control groups PM is switched to another set of parts (channels). The part setting alter processing is activated, when the part change switch PC among the general controls GM in the control panel PN is manipulated.

As this process flow is started, a step P1 alters the set conditions of the respective part controls PM based on the allotted part setting buffers of each part for which the part controls are to be set anew. The set conditions subject to alteration are the indication of the part indicator PD, the lamp illumination of the solo switch SS, the slider knob position of the tone volume slider VS, and so forth. After conducting these alterations, the part setting alter processing is finished, and the process flow returns to the main routine (FIG. 5), at the step M4.

Various Forms of Embodiment

Although the above description has been made with respect to a preferred embodiment of the present invention, the present invention can be practiced in various forms as enumerated below.

(1) The musical signals which are assigned to the respective performance parts, i.e. the playback channels, may not necessarily be inputted externally, but may be the part data representing the respective musical performance parts as played back by using an automatic music performing device equipped within the present system (mixer device). Alternatively, the musical signals inputted externally and the performance data generated internally may be assigned to the respective performance parts in an mingled way.

(2) While the illustrated embodiment comprises a control (contrast switch) which sets the playback conditions of the suppressed mode for all the parts in a lump, such controls for setting the playback conditions may be provided in connection with individual parts, or such controls may be provided, each for each group of parts which are grouped in a smaller number of groups out of a plurality of parts. Further alternatively, the apparatus may be designed so that the user can select whether to set the playback conditions of the suppressed mode individually for each of the part, or in common for each group of parts, or in common for all the parts. As long as there is provided a control or controls with which the user can set the playback condition for the suppressed playback mode, any type of devices will be available for the present invention.

(3) The data or information concerning the setting of the playback conditions at the time of the suppressed playback mode may not necessarily be set by the controls, but may be contained in the externally inputted data or in the internally stored music performance data (to be used for playback) so that the data for the setting may be read out at the time of reading out the externally inputted data or the internally stored performance data.

(4) The control (solo clear switch) for batch canceling the enhanced modes (solo functions) may not necessarily be the type which batch cancels all the set states of the enhanced mode of plural parts at a time, but may be solo switches each provided for each of the grouped parts. In such a situation, the solo clear switch configuration will be so designed that when the enhanced mode is cleared at a certain group of parts while the enhanced mode is rendered "on" at any other group of parts, such other parts remains in the enhanced mode (i.e. only all the parts in the group of which the enhanced mode has been canceled by the solo clear switch are changed to the suppressed mode), and that only when the solo clear switch designation is given and there remains no group containing the parts running in the enhanced mode, the playback conditions for all the parts are changed to the ordinary playback mode.

(5) The parameters to be controlled in connection with the playback modes may not necessarily be limited to the tone volume, but may be effect parameters as set for individual playback parts. The gist is that the part which is rendered to be in an enhanced mode has only to be played back more prominetly than the parts which are not rendered to be in enhanced modes.

(6) Plural kinds of conditions may be provided for making an enhanced mode, and such conditions may be selectable by the user to establish the enhanced mode. For example, the enhanced mode may be established by the prominence in the tone volume or in the tone effect, and there may be provided a selection switch for selecting either the tone volume or the tone effect so that the solo switch, the solo clear switch, or the contrast dial will selectively control either the tone volume or the tone effect in order to render the enhanced mode (or solo function).

(7) The number of mixing parts, i.e. performance parts or playback channels may not be limited to the described one (which is "six").

(8) The method for setting the playback condition for the suppressed playback mode may not necessarily be limited to the multiplication type, but may be a type in which the value itself as set by the control (i.e. the contrast dial) for setting the playback condition for the suppressed mode may be directly used (e.g. as the tone volume value) to determine the condition. Or alternatively, a set value may be subtracted from the control parameters (e.g. tone volume value) for the respective parts in the suppressed playback mode. The gist is that the playback condition (e.g. tone volume) for the suppressed playback mode has only to be altered.

(9) The data format of the music performance data for playing back the music performance may be any type of prevailing formats including the "event +relative time" type which represents the time point of an event by a time lapse from the preceding event, the "event+absolute time" type which represents the time point of an event by an absolute time point in each measure or the entire music piece, the "note (rest) event +duration" type which represents a note (or rest) by the pitch (or blank) and the duration, and the "direct memory mapping" type in which memory regions are secured (allotted) for all the available time points under the minimum resolution of time progression for the music and each event is written at a memory region which is allotted to the time point for such each event.

(10) The control programs such as a program for performance data search processing and various data to be used in the performance data search may be supplied from external storage media or from external systems via the communication interface to the playback apparatus (digital mixer) of the present invention. The communication interface and the communication network may not necessarily be of a cable type, but may be a radio type, or both may be equipped in the apparatus.

As will be understood from the above detailed description, the present invention provides an apparatus for playing back music with an enhanced part performance which plays back a plurality of performance parts constituting in combination a consolidated music performance, wherein a particular part or parts can be played back in an enhanced mode as designated by the solo switch, and plural parts running in the enhanced mode can be batch canceled as designated by the solo clear switch. Thus, plural parts under playback in the enhanced mode can be batch-canceled by a simple operation by the user. The user can thus enjoy the music playback incorporating a complex control in the solo function with minimal complexity.

Further, according to the present invention, in controlling the playback conditions of a plurality of music performance parts, solo function can be set by a solo switch, and a contrast dial is provided for setting the playback conditions for the parts which is not set to be in the enhanced mode, so that the playback conditions such as a tone volume of the part which is not set to be in the enhanced mode is set based on the playback condition as designated by the manipulation of the control. Namely, the performance condition for the part which is not set to be in the enhanced mode is set by the manipulation of the contrast dial, and accordingly the user can set the playback mode situation when the solo function is designated. Thus, the user can recognize the solo function by the playback of the music performance data with the maximal playback condition (relative positions of prominence among plural parts) as the user intends.

While several forms of the invention have been shown and described, other forms will be apparent to those skilled in the art without departing from the spirit of the invention. Therefore, it will be understood that the embodiments shown in the drawings and described above are merely for illustrative purposes, and are not intended to limit the scope of the invention, which is defined by the appended claims.

What is claimed is:

1. An apparatus for playing music with an enhanced part performance comprising:

a plurality of channels each for playing music signals of each assigned part of plural performance parts constituting in combination a consolidated music performance, at least two of said plurality of part playing channels each being capable of selectively playing the music signals of the assigned performance part in an enhanced mode according to a designated state, the enhanced mode being a mode in which the music signals are played more prominently than in an unenhanced mode;

an enhanced mode designating device provided in association with said at least two channels, for selectively designating a set state of the enhanced mode for the associated channel to cause the music signals of the assigned part to be played in said enhanced mode of performance, when said set state is designated, and in said unenhanced mode of performance, when said set state is riot designated; and an enhanced mode batch clear designating device which designates cancellation of all of said set states of the enhanced mode for said associated channels, thereby rendering said unenhanced mode of performance in all of said at least two channels.

2. An apparatus for playing music with an enhanced part performance according to claim 1, wherein the playing of the music signals of the assigned performance part in said enhanced mode is realized by suppressing the playing of the music signals by all channels other than the channels for which said enhanced mode is designated.

3. An apparatus for playing music with an enhanced part performance according to claim 2, wherein said suppressing of the playing of the music signals is realized by decreasing the tone volume of the music signals played by the other channels.

4. An apparatus for playing music with an enhanced part performance according to claim 1, wherein said plurality of channels are adapted to play music signals input in real time.

5. An apparatus for playing music with an enhanced part performance comprising:

a plurality of channels each for playing music signals of each assigned part of plural performance parts constituting in combination a consolidated music performance, at least two of said plurality of channels each being capable of selectively playing the music signals of the assigned performance part In an enhanced mode according to a designated state, the enhanced mode being anode in which the music signals are played more prominently than in an unenhanced mode;

an enhanced mode designating device provided in association with said at least two channels, which device selectively designates a set state of the enhanced mode for the associated channel to render the music signals of the assigned part to be played in said enhanced mode of performance, when said set state is designated, and in said unenhanced mode of performance, when said set state is not designated; and a performance condition controlling device for controlling a condition of said unenhanced mode of performance.

6. An apparatus for playing music with an enhanced part performance according to claim 5, wherein said performance condition controlling device includes first control devices, each provided for each of said at least two channels, for controlling the condition of said unenhanced mode of performance, and a second control device, provided for all of said at least two channels in common, for controlling the condition of said unenhanced mode of performance, whereby the condition of said unenhanced mode of performance is controlled by said first control device and said second control device in combination.

7. An apparatus for playing music with an enhanced part performance according to claim 5, wherein said performance condition controlling device controls the condition of said unenhanced mode of performance in common by means of a common control signal.

8. An apparatus for playing music with an enhanced part performance according to claim 5, wherein said performance condition controlling device is capable of controlling the condition of said unenhanced mode of performance, while at least one of said channels is playing the music signals in said enhanced mode.

9. An apparatus for playing music with an enhanced part performance according to claim 5, wherein in case said mode designating device designates a set state of the enhanced mode anew for a single channel among said plurality of channels while all the other channels are set under said unenhanced mode, said mode designating device causes all said other channels to play the music signals in a suppressed mode.

10. An apparatus for playing music with an enhanced part performance according to claim 5, wherein in case said mode designating device designates a set state of the enhanced mode anew for a single channel among said plurality of channels while another channel, which is set under said enhanced mode, exists, said mode designating device causes said single channel to play the music signals in said enhanced mode.

11. An apparatus for playing music with an enhanced part performance according to claim 5, wherein said performance condition controlling device decreases the tone volume of the music signals played by the associated channel.

12. An apparatus for playing music with an enhanced part performance according to claim 5, wherein said plurality of channels are adapted play music signals input in real time.

13. A computer program containing program instructions executable by a computer and causing said computer to execute:

a process of providing a plurality of channels each for playing music signals of each assigned part of plural performance parts constituting in combination a consolidated music performance, at least two of said plurality of channels each being capable of selectively playing the music signals of the assigned performance part in an enhanced mode according to a designated state, the enhanced mode being a mode in which the music signals are played more prominently than in an unenhanced mode;

a process of selectively designating a set state of the enhanced mode for each of said at least two channels to cause the music signals of the assigned part to be played in said enhanced mode of performance, when said set state is designated, and in said unenhanced mode of performance, when said set state is not designated; and a process of clearing all of said set states of the enhanced mode for said associated channels, thereby rendering said unenhanced mode of performance in all of said at least two channels.

14. A computer program according to claim 13, wherein said plurality of channels are adapted to play music signals input in real time.

15. A computer program containing program instructions executable by a computer and causing said computer to execute:

a process of providing a plurality of channels each for playing music signals of each assigned part of plural performance parts constituting in combination a consolidated music performance, at least two of said plurality of channels each being capable of selectively playing the music signals of the assigned performance part selectively in an enhanced mode according to a designated state, the enhanced mode being a mode in which the music signals are played more prominently than in an unenhanced mode;

a process of selectively designating a set state of the enhanced mode for each of said at least two channels to cause the music signals of the assigned part to be played in said enhanced mode of performance, when said set state is designated, and in said unenhanced mode of performance, when said set state is not designated; and a process of controlling a condition of said unenhanced mode of performance.

16. A computer program according to claim 15, wherein said plurality of channels are adapted to play music signals input in real time.

* * * * *